US00RE49692E

(19) United States
(12) Reissued Patent
Newton et al.

(10) Patent Number: US RE49,692 E
(45) Date of Reissued Patent: Oct. 10, 2023

(54) HIGH DYNAMIC RANGE IMAGE SIGNAL GENERATION AND PROCESSING

(71) Applicant: KONINKLIJKE PHILIPS N.V., Eindhoven (NL)

(72) Inventors: Philip Steven Newton, Eindhoven (NL); Wiebe De Haan, Eindhoven (NL)

(73) Assignee: Koninklijke Philips N.V., Eindhoven (NL)

(21) Appl. No.: 17/060,245

(22) Filed: Oct. 1, 2020

Related U.S. Patent Documents

Reissue of:
(64) Patent No.: 10,097,822
Issued: Oct. 9, 2018
Appl. No.: 14/116,382
PCT Filed: Apr. 27, 2012
PCT No.: PCT/IB2012/052102
§ 371 (c)(1),
(2) Date: Nov. 8, 2013
PCT Pub. No.: WO2012/153224
PCT Pub. Date: Nov. 15, 2012

(30) Foreign Application Priority Data

May 10, 2011 (EP) ..... 11165491

(51) Int. Cl.
*H04N 19/98* (2014.01)
*G09G 5/00* (2006.01)

(Continued)

(52) U.S. Cl.
CPC ..... *H04N 19/98* (2014.11); *G09G 5/006* (2013.01); *G09G 5/02* (2013.01); *H04N 9/64* (2013.01);

(Continued)

(58) Field of Classification Search
CPC ..... H04N 19/98; H04N 9/64; G09G 5/02; G09G 5/006; G09G 2370/04; G09G 2370/12; G09G 2340/06
See application file for complete search history.

(56) References Cited

U.S. PATENT DOCUMENTS 9,292,940 B2 3/2016 Newton
2005/0094726 A1* 5/2005 Park ..... H04N 21/234327 375/240.08

(Continued)

FOREIGN PATENT DOCUMENTS

CN 101193202 A 6/2008
CN 101951510 A 1/2011

(Continued)

OTHER PUBLICATIONS

"scRGB", from Wikipedia, Jan. 11, 2010 http://en.wikipedia.org/wiki/ScRGB.

(Continued)

*Primary Examiner* — Eric B. Kiss
*Assistant Examiner* — Nick Corsaro

(57) ABSTRACT

An apparatus generates an image signal in which pixels are encoded in N-bit words which encode at least a luma per pixel. A receiver (201) obtains high dynamic range pixel values in accordance with a first color representation in M-bitwords. A first generator (203) includes the high dynamic range pixel values in the image signal in the N-bit words according to a second color representation. A second generator (205) includes in the image signal an indicator that high dynamic range pixel values are encoded. In some examples, the high dynamic range pixel values may be provided in a segment that can alternatively contain high or low dynamic range pixel values, and the indicator may indicate which type of data is included. The approach may (Continued)

e.g. facilitate introduction of high dynamic range capability into e.g. HDMI systems.

25 Claims, 7 Drawing Sheets

(51) Int. Cl.
*G09G 5/02* (2006.01)
*H04N 9/64* (2023.01)

(52) U.S. Cl.
CPC ..... *G09G 2340/06* (2013.01); *G09G 2370/04* (2013.01); *G09G 2370/12* (2013.01)

(56) References Cited

U.S. PATENT DOCUMENTS

| | | | | |
|---|---|---|---|---|
| 2007/0269115 | A1* | 11/2007 | Wang | H04N 19/124 382/232 |
| 2009/0067506 | A1* | 3/2009 | Doser | H04N 19/176 375/240.18 |
| 2009/0278984 | A1* | 11/2009 | Suzuki | G09G 5/003 348/554 |
| 2009/0322800 | A1 | 12/2009 | Atkins | |
| 2010/0220796 | A1* | 9/2010 | Yin | H04N 19/159 375/240.29 |
| 2012/0224640 | A1* | 9/2012 | Sole Rojals | H04N 19/124 375/240.18 |
| 2012/0314965 | A1* | 12/2012 | Kashiwagi | H04N 19/597 382/232 |
| 2013/0235072 | A1* | 9/2013 | Longhurst | H04N 1/46 345/605 |

FOREIGN PATENT DOCUMENTS

| | | | |
|---|---|---|---|
| JP | 2002510177 | A | 4/2002 |
| JP | 2008519497 | A | 6/2008 |
| JP | 2011511545 | A | 4/2011 |
| WO | WO9937096 | A1 | 7/1999 |
| WO | WO2005104035 | A1 | 11/2005 |
| WO | WO2006050305 | A1 | 5/2006 |
| WO | WO2009095132 | A1 | 8/2009 |
| WO | 2010021705 | A1 | 2/2010 |
| WO | WO2010104624 | A2 | 9/2010 |
| WO | WO2010105036 | A1 | 9/2010 |

OTHER PUBLICATIONS

"RGBE image Format", from Wikipedia, Feb. 11, 2010.

"High-Definition Multimedia Interface Specification Version 1.4a", Mar. 4, 2010, HDMI Licensing, LLC.

"Half Precision Floating-Point Format", from Wikipedia, Feb. 11, 2010 http://en.wikipedia.org/wiki/Half_precision.

"Sony Global—Technology—xvYCC, Extended-Gamut Color Space for Video Applications", Jan. 11, 2010 http://www.sony.net/SonyInfo/technology/technology/theme/xvycc_01.html.

"Color Depth", from Wikipedia, Feb. 11, 2010 http://en.wikipedia.org/wiki/Color_depth.

CEA Standard, "A DTV Profile for Uncompressed High Speed Digital Interfaces", CEA 861-D, Jul. 2006 Copyright may not be reproduced w/o permission.

"Display Port", from Wikipedia, Feb. 11, 2010, pp. 1-10 http://en.wikipedia.org/wiki/Displayport.

Guan J. et al., "Display HDR Image Using a Gain Map", School of Computer Science, University of Nottingham, ICIP 2007, pp. 521-524.

Mantiuk R. et al., "Color Correction for Tone Mapping", EUROGRAPHICS 2009, vol. 28 (2009), No. 2.

High-Definition Multimedia Interface Specification, Informational Version 1.0, Sep. 4, 2003 http://www.hdmi.org/pdf/HDMISpecInformationalVersion.

* cited by examiner

HIGH DYNAMIC RANGE IMAGE SIGNAL GENERATION AND PROCESSING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 10,097,822. The reissue applications are application Ser. No. 17/060,245 (the instant application) and application Ser. No. 17/890,298, filed 18 Aug. 2022 as a continuation reissue application of application Ser. No. 17/060,245.*

FIELD OF THE INVENTION

The invention relates to generation and/or processing of an image signal comprising high dynamic range pixel values.

BACKGROUND OF THE INVENTION

Digital encoding of various source signals has become increasingly important over the last decades as digital signal representation and communication increasingly has replaced analogue representation and communication. Continuous research and development is ongoing in how to improve the quality that can be obtained from encoded images and video sequences while at the same time keeping the data rate to acceptable levels.

An important factor for perceived image quality is the dynamic range that can be reproduced when an image is displayed. However, conventionally, the dynamic range of reproduced images has tended to be substantially reduced in relation to normal vision. Indeed, luminance levels encountered in the real world span a dynamic range as large as 14 orders of magnitude, varying from a moonless night to staring directly into the sun. Instantaneous luminance dynamic range and the corresponding human visual system response can fall between 10.000:1 and 100.000:1 on sunny days or at night.

Traditionally, dynamic range of image sensors and displays has been confined to lower dynamic ranges of magnitude. Also, displays are often limited by viewing environment (they may render black if the luminance generation mechanism is switched off, but then they still reflect e.g. environmental light on their front glass; a television in sunny daytime viewing may have DR<50:1). Consequently, it has traditionally been possible to store and transmit images in 8-bit gamma-encoded formats without introducing perceptually noticeable artifacts on traditional rendering devices. However, in an effort to record more precise and livelier imagery, novel High Dynamic Range (HDR) image sensors that are capable of recording dynamic ranges of more than 6 orders of magnitude have been developed. Moreover, most special effects, computer graphics enhancement and other post-production work are already routinely conducted at higher bit depths and with higher dynamic ranges.

Furthermore, the contrast and peak luminance of state-of-the-art display systems continues to increase. Recently, new displays have been presented with a peak luminance as high as 4000 Cd/m$^{-2}$ and contrast ratios of up to perhaps 5-6 orders of magnitude although this is typically reduced to significantly less in real life viewing environments. It is expected that future displays will be able to provide even higher dynamic ranges and specifically higher peak luminances and contrast ratios. When traditionally encoded 8-bit signals are displayed on such displays, annoying quantization and clipping artifacts may appear, or the grey values of the different regions may be incorrectly rendered, etc. Artefacts may be particularly noticeable if compression such as DCT compression according to an MPEG or similar still image or video compression standard is used somewhere along the imaging chain, from content creation to ultimate rendering. Moreover, traditional video formats offer insufficient headroom and accuracy to convey the rich information contained in new HDR imagery.

As a result, there is a growing need for new approaches that allow a consumer to fully benefit from the capabilities of state-of-the-art (and future) sensors and display systems. Preferably, representations of such additional information are backwards-compatible such that legacy equipment can still receive ordinary video streams, while new HDR-enabled devices can take full advantage of the additional information conveyed by the new format. Thus, it is desirable that encoded video data not only represents HDR images but also allow encoding of the corresponding traditional Low Dynamic Range (LDR) images that can be displayed on conventional equipment.

A critical issue for the introduction of increased dynamic range video and images is how to effectively encode, store, and distribute the associated information. In particular it is desirable that backwards compatibility is maintained, and that the introduction of high dynamic range images to existing systems is facilitated. Also efficiency in terms of data rate and processing complexity is significant. Another critical issue is of course the resulting image quality.

Hence, an improved approach for distributing, communicating and/or representing high dynamic range images would be advantageous.

SUMMARY OF THE INVENTION

Accordingly, the Invention seeks to preferably mitigate, alleviate or eliminate one or more of the disadvantages with prior art singly or in any combination.

According to an aspect of the invention there is provided an apparatus for generating an image signal in which pixels are encoded in N-bit words, encoding at least a luma per pixel, the apparatus comprising: a receiver for obtaining high dynamic range pixel values in accordance with a first color representation in M-bit words; a first generator for including the high dynamic range pixel values in the image signal in the N-bit words according to a second color representation; and a second generator for including in the image signal an indicator that high dynamic range pixel values are encoded.

Note that pixel value words may be encoded over separated data sections such as e.g. components, or, some sections may comprise data which is not High Dynamic Range (HDR) perse.

The invention may provide an improved image signal for distributing High Dynamic Range (HDR) image data. The approach may in particular provide improved backwards compatibility in many applications and/or may e.g. facilitate introduction of HDR image distribution into existing image and video systems.

The image signal may be a single image signal, such as a digital image file, or may e.g. be a video signal comprising a plurality of images.

The N-bit words may comprise a plurality of components which may separately and individually represent different color components. An N-bit word may represent a plurality of color components. The N-bit word may be divided into different segments which may be allocated to individual color components. For example, N1 bits may be used for pixel data for a first color component, N2 bits may be used for pixel data for a second color component, and N3 bits may be used for pixel data for a third color component (where e.g. N1+N2+N3=N). As a specific example, an RGB color representation may be provided in N-bit words where N/3 bits are allocated to each of the R, G and B color components.

Similarly, the M-bit words may comprise a plurality of components which may separately and individually represent different color components. An M-bit word may represent a plurality of color components. The M-bit word may be divided into different segments which may be allocated to individual color components. For example, M1 bits may be used for pixel data for a first color component, M2 bits may be used for pixel data for a second color component, and M3 bits may be used for pixel data for a third color component (where e.g. M1+M2+M3=M).

The image signal may be a single continuous and all-inclusive image signal. However, in other embodiments, the image signal may be a composite or divided image signal. For example, the pixel data for the image in the form of the N-bits words may be spread over several data packets or messages. Similarly, the indicator may be provided together with or separate from the N-bit words, e.g. stored in a different part of a memory, or even provided via a different communication link. For example, the indicator may be transmitted in different data packets or messages than the N-bit words. E.g. the image signal may be divided into image data packets and control data packets with the N-bit words being provided in the former and the indicator being provided in the latter type of data packets. Minimally, encoder and decoder would have a fixed (single or multiple) way of encoding HDR data into a fixed available N-bit word, and then the indicator would be simple, and just say that the encoded data represents "HDR data" or e.g. "HDR-type-1" or "HDR-type-2" data rather than LDR data. The receiving side would then according to the agreed e.g. type-2 encoding scenario know how to ultimately transform this into the signal to be rendered on a display (or printer etc.). Such a scenario can be used e.g. when arbitrary HDR originals (e.g. with 16 bit lumas with the code maximum corresponding to peak white 5000 nit, or 22 bit lumas with peak white 550000 nit), are first transformed to an intermediate signal (which is more usable for display, since a bright object of 550000 nit cannot be rendered anyway, so is preferably first graded to some value which still conveys enormous brightness, yet can be rendered on a display, e.g. 5000 nit). The difficult mathematics or artistical choices of converting the real world scene representation into a useful, renderable signal is then taken out of this part of the imaging chain, and dealt with in a previous part, so that type-2 encoding should only deal with converting whatever ended up in the intermediate M-bit representation, to the type-2 N-bit representation. However, the indicator may be more complex, or otherwise stated co-supplied with additional data specifying how exactly a mapping was done to the N-bit signal, so that e.g. also the 22 bit/550000 nit originals can directly be applied to the second imaging chain part and converted to the N-bit signal. In such cases useful information would be (linear) scaling information (e.g. associated with a scaling between a first range of luminances associated with the first encoding of M-bits words versus a second range of the N-bit words), such as e.g. a specification of the 550000 nit level (or a derived white value indication, e.g. an estimated, scaled, or intended-to-be-rendered on a reference display white level [which one may see as an example of an associated display luminance], which an actual receiving display may then optimally map according to what it can maximally generate as peak white; i.e. it will render data which had an encoded white level of e.g. 5000 nits differently than data with a white level of 50000 nits, e.g. if the display can show a peak white of 10000 nits it may render the first white [i.e. pixels having code value of Y=1023 e.g.] as display output luminance equal to 6000 nit, and the second as display output luminance equal to 10000 nit). And it may be further useful to include information on how exactly all luma or color values along the range of codeable colors in the M-bit representation are distributed along the codeable range of the N-bit signal, e.g. to use the bits in the new N-bit representation the best possible way and encode as precise as possible all the texture of various important objects along the luminance range in the inputed pictures in the M-bit representation, e.g. by co-encoding mapping functions. Of course all of these may dynamically vary between different scenes of a movie, e.g. switching between plain indoors well-lit scenes which may best be represented with LDR encodings, to a scene outside with spectacularly bright fireworks, which may best be represented with a more HDR-tuned variant, with different image statistics resulting in different N-bit encoding statistics.

In accordance with an optional feature of the invention, the first color representation is different from the second color representation.

This may provide improved performance in many embodiments and may in many scenarios specifically allow a highly efficient communication of HDR image data. The apparatus may adapt HDR image data to specifically match the requirements, characteristics and/or preferences of the specific distribution medium.

In accordance with an optional feature of the invention, the apparatus further comprises a transformation unit for transforming the high dynamic range pixel values from the first color representation to the second color representation.

This may provide improved performance in many embodiments and may in many scenarios specifically allow a highly efficient communication of HDR image data. The apparatus may adapt HDR image data to specifically match the requirements, characteristics and/or preferences of the specific distribution medium.

In accordance with an optional feature of the invention, the transformation comprises a compression of M-bit words into N-bit words, where M is larger than N.

A more efficient image signal for distributing HDR content may be achieved in many embodiments. A compression allowing a more efficient distribution may for example apply non-linear transformations to transform e.g. a linear M-bit word color representation into a non-linear N-bit word color representation.

In accordance with an optional feature of the invention, the compression comprises using a different quantization scheme for the pixel values in accordance with the second color representation than for the pixel values in accordance with the first color representation. A more efficient image signal for distributing HDR content may be achieved in many embodiments. The quantization scheme for the second color representation may e.g. allow the dynamic range to be covered by fewer quantization levels and may allow N to be smaller than M. The quantization scheme for the second color representation may for example be a non-uniform quantization of the color component values and/or luminance dynamic range.

In accordance with an optional feature of the invention, the first color representation is the same as the second color representation.

This may allow an efficient representation and/or low complexity and/or facilitated operation in many scenarios. In particular, it may allow low complexity and low computational resource processing to be used to efficiently handle high dynamic range images.

In accordance with an optional feature of the invention, the indicator comprises an indication of a display luminance associated with the second color representation.

The image signal may include an indication of how the provided pixel values are nominally correlated to intended luminances. The approach may e.g. allow a display receiving the image signal to adapt the rendering of the pixel values to correspond to the actual characteristics of the display. For example, transforms may be applied to provide accurate or appropriate conversions from the nominal or reference displays associated with the second color representation to the actual display used for the rendering.

The indicator may specifically provide an indication of a reference luminance corresponding to a reference pixel value. For example, the luminance corresponding to the pixel value representing the highest luminance of the second color representation may be indicated by the indicator.

The approach may allow any HDR space to be encoded while allowing it to be displayed on any display. For example, an HDR image may be encoded to correspond to a dynamic range with a brightest radiation of 50 000 nits. However, when rendering such a signal on a 1000 nit display, it is desirable to provide an intelligent mapping between the encoded dynamic range and the dynamic range of the rendering. Such a transformation can be improved and/or facilitated by the indicator indicating a display luminance associated with the second color representation.

In accordance with an optional feature of the invention, the indicator comprises an indication of the second color representation.

This may improve performance and/or facilitate rendering. In particular, it may allow a device receiving the image signal to optimize its processing to the specific color representation used. Color representations may specify both how data values are packed (e.g. first a luma, then a hue as a 3-bit component, then a saturation according to some allocation mapping of the successive word bits), and what they mean (which primaries etc.)

In accordance with an optional feature of the invention, the first color representation employs a separate color value for each color component of the first color representation, and the second color representation employs a set of color values for each color component of the second color representation together with a common exponential factor.

This may provide a particularly efficient representation. The set of color values for each color component of the second color representation may correspond to a linear or non-linear (such as e.g. a logarithmic) representation of the color component luminance values.

In accordance with an optional feature of the invention, the image signal comprises a segment for pixel image data, and the first generator is arranged to alternatively include low dynamic range pixel values or the high dynamic range pixel values according to a second color representation in the segment, and the indicator is arranged to indicate whether the first segment comprises low dynamic range color values or high dynamic range color values.

This may provide a particularly advantageous representation. In many scenarios it may provide improved backwards compatibility and/or facilitate introduction of HDR in existing systems or standards. The approach may in particular allow existing video distribution approaches for low dynamic range image distribution to readily be adapted to high dynamic range image distribution.

The segment may for example be a segment reserved for communication of enhanced color data. For example, an image signal standard may allow image data to be communicated in accordance with a standard color representation and in accordance with an enhanced color representation, where the enhanced color representation allows improved chromaticity representation relative to the standard color representation (e.g. a finer chromaticity quantization, or a wider gamut). Typically the enhanced color representation may use more bits than the standard color representation. The approach may allow a segment reserved for the enhanced color representation to be used for communication of high dynamic range data.

In accordance with an optional feature of the invention, the second generator is arranged to further include a second indicator in the image signals, the second indicator being indicative of the segment being used for low dynamic range pixel values both when the segment comprises low dynamic range pixel values and when the segment comprises high dynamic range pixel values.

This may provide a particularly advantageous representation. In many scenarios it may provide improved backwards compatibility and/or facilitate introduction of HDR in existing systems or standards. The approach may in particular allow existing video distribution approaches for low dynamic range image distribution to readily be adapted to allow high dynamic range image distribution.

The use of the second indicator, which may indicate that the segment uses low dynamic range data even when it contains high dynamic range data, may be used to ensure that processing or distribution based on this indicator will be the same as for low dynamic range data. This may avoid conflicts, and in particular may allow functionality not capable of processing high dynamic range data or the first indicator to still process the signal. Other functionality may then exploit the first indicator to process the pixel values as high dynamic range data. For example, in some embodiments, only the rendering display will use the first indicator to process the pixel data whereas intervening distributing or storage functionality is based only on the second indicator, and thus need not be capable of processing the first indicator or indeed high dynamic range pixel values. The second indicator may be an existing standardized indicator with the first indicator being a new indicator introduced to an existing standard.

In accordance with an optional feature of the invention, a number of bits K reserved for each pixel in the segment is larger than N.

This may allow improved and/or facilitated operation in many scenarios. In some embodiments, the K-N bits may be used for communication of other data, such as e.g. chromaticity enhancement data.

In accordance with an optional feature of the invention, the image coding signal is in accordance with an HDMI standard.

The invention may provide a particularly advantageous HDMI™ (High-Definition Multimedia Interface) image signal for distribution in accordance with the HDMI™ standards.

In accordance with an optional feature of the invention, the first generator is arranged to include the high dynamic range pixel values in a Deep Color data segment.

This may provide for a particularly advantageous approach and may in particular allow improved backwards compatibility.

In accordance with an optional feature of the invention, the second generator is arranged to include the indicator in an Auxiliary Video Information InfoFrame.

This may provide for a particularly advantageous approach and may in particular allow improved backwards compatibility.

In accordance with an optional feature of the invention, the image coding signal is in accordance with a DisplayPort standard.

The invention may provide a particularly advantageous DisplayPort™ image signal for distribution in accordance with the DisplayPort™ standards.

According to an aspect of the invention there is provided a method of generating an image signal in which pixels are encoded in N-bit words, encoding at least a luma per pixel, the method comprising the steps: obtaining high dynamic range pixel values in accordance with a first color representation in M-bit words; including the high dynamic range pixel values in the image signal in the N-bit words according to a second color representation; and including in the image signal an indicator that high dynamic range pixel values are encoded.

According to an aspect of the invention there is provided an apparatus for processing an image signal, the apparatus comprising: a receiver for receiving the image signal, a data segment of the image signal comprising one of high dynamic range pixel values in N-bit words according to a first color representation and low dynamic range pixel values according to a second color representation, and for receiving an indicator indicative of whether the data segment comprises the high dynamic range pixel values or the low dynamic range pixel values; an extractor for extracting data of the data segment; and a processor arranged to process the data of the data segment as high dynamic range pixel values or as low dynamic range pixel values dependent on the indicator.

In accordance with an optional feature of the invention, the image signal is in accordance with an HDMI standard, and the apparatus further comprises means for transmitting an indication of the capability to process high dynamic range pixel values in an HDMI vendor specific data block.

This may allow a particularly advantageous image signal distribution. In particular, it may provide improved backwards compatibility and/or facilitated introduction of HDR information in HDMI systems.

According to an aspect of the invention there is provided a method of processing an image signal, the method comprising: receiving the image signal, a data segment of the image signal comprising one of high dynamic range pixel values in N-bit words according to a first color representation and low dynamic range pixel values according to a second color representation; receiving an indicator indicative of whether the data segment comprises the high dynamic range pixel values or the low dynamic range pixel values; extracting data of the data segment; and processing the data of the data segment as high dynamic range pixel values or as low dynamic range pixel values dependent on the indicator.

According to an aspect of the invention there is provided an image signal in which pixels are encoded in N-bit words, encoding at least a luma per pixel, the image signal comprising: the high dynamic range pixel values in the image signal in the N-bit words according to a color representation; and an indicator that high dynamic range pixel values are encoded These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
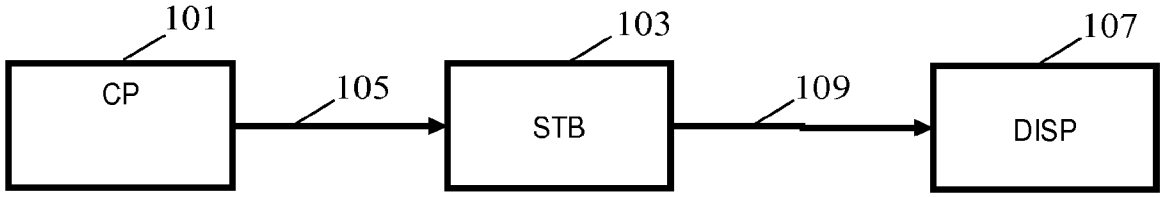
FIG. 1 is an illustration of a distribution path for audio-visual content.

FIG. 1 illustrates an example of an audio visual distribution path. In the example, a content provider apparatus 101 generates an audio visual content signal for an audiovisual content item, such as e.g. a film, a television program etc. The content provider apparatus 101 may specifically encode the audiovisual content in accordance with a suitable encoding format and color representation. In particular, the content provider apparatus 101 may encode the images of a video sequence of the audiovisual content item in accordance with a suitable representation such as e.g. YCrCb. The content provider apparatus 101 may be considered to represent a production and distribution house which creates and broadcasts the content.

The audio visual content signal is then distributed to a content processing device 103 via a distribution path 105. The content processing device 103 may for example be a set-top box residing with a specific consumer of the content item.

The audio-visual content is encoded and distributed from the content provider apparatus 101 through a medium, which may e.g. consist of packaged media (DVD or BD etc.), Internet, or broadcasting. It then reaches a source device in the form of the content processing device 103 which comprises functionality for decoding and playing back the content.

It will be appreciated that the distribution path 105 may be any distribution path and via any medium or using any suitable communication standard. Further, the distribution path need not be real time but may include permanent or temporary storage. For example, the distribution path may include the Internet, satellite or terrestrial broadcasting etc., storage on physically distributed media such as DVDs or Blu-ray Disc™ or a memory card etc. Likewise, the content processing device 103 may be any suitable device such as a Blu-ray™ Player, a satellite or terrestrial television receiver, etc.

The content processing device 103 is coupled to a display 107 via a communication path 109. The content processing device 103 generates a display signal comprising an audio visual signal representing the audiovisual content item. The display signal may specifically be the same as the audiovisual content signal. Thus, the source device streams the decoded content to a sink device, which may be a TV or another device which converts the digital signals to a physical representation.

In some embodiments the data representing the images of the audio visual content are the same for the audiovisual content signal and for the display signal. In this example, the display 107 may comprise functionality for image processing including e.g. generation of images with increased dynamic range. However, it will be appreciated that in some embodiments, the content processing device 103 may perform e.g. image enhancement or signal processing algorithms on the data and may specifically decode and re-encode the (processed) audiovisual signal. The re-encoding may specifically be to a different encoding or representation format than for the audiovisual content signal.

The system of FIG. 1 is arranged to provide a High Dynamic Range (HDR) video information. Further, in order to provide e.g. improved backwards compatibility, it may also in some scenarios provide Low Dynamic Range (LDR) information that allows an LDR image to be presented. Specifically, the system is able to communicate/distribute image signals relating to both LDR and HDR images The approach described in the following may be applied on either one or both of the link 105 from the content provider apparatus 101 to the content processing device 103 and the link 109 from the content processing device 103 to the display 107. Furthermore, the approach may be applied differently on the two paths, e.g. by using different color representations or encoding standards. The following description will however for brevity and clarity focus on the application of the approach to an interface between and audio-visual set-top box and a corresponding display. Thus, the description will focus on an application to the communication path 109 between the content processing device 103 and the display 107 in FIG. 1.

Conventional displays typically use an LDR representation. Typically such LDR representations are provided by a three component 8 bit representation related to specified primaries. For example, an RGB color representation may be provided by three 8 bit samples referenced to a Red, Green, and Blue primary respectfully. Another representation uses one luma component and two chroma components (such as YCrCb). These LDR representations correspond to a given brightness or luma range.

However, increasingly image capturing devices are provided which can capture larger dynamic ranges. For example, cameras typically provide 12 bit, 14 bit or even 16 bit ranges. Thus, compared to a conventional standard LDR 8 bit camera, an HDR camera may faithfully (linearly) capture, 12 bit, 14 bit (or higher) ranging from a brighter white to a given black. Thus, the HDR may correspond to an increasing number of bits for the data samples corresponding to LDR thereby allowing a higher dynamic range to be represented.

HDR specifically allows for significantly brighter images (or image areas) to be presented. Indeed, an HDR image may provide a substantially brighter white than can be provided by the corresponding LDR image. Indeed, an HDR image may allow at least four times brighter white than the LDR image. The brightness may specifically be measured relative to the darkest black that can be represented or may be measured relative to a given grey or black level.

The LDR image may specifically correspond to specific display parameters, such as a fixed bit resolution related to a specific set of primaries and/or a specific white point. For example, 8-bits may be provided for a given set of RGB primaries and e.g. a white point of 500 $Cd/m^2$. The HDR image is an image which includes data that should be rendered above these restrictions. In particular, a brightness may be more than four times brighter than the white point (e.g. 2000 $Cd/m^2$) or more.

High dynamic range pixel values have a luminance contrast range (brightest luminance in the set of pixels divided by darkest luminance) which is (much) larger than a range that can be faithfully displayed on the displays standardized in the NTSC and MPEG-2 era (with its typical RGB primaries, and a D65 white with for maximum driving level [255, 255, 255] a reference brightness of e.g. 500 nit or below). Typically for such reference display 8 bits suffice to display all grey values between approximately 500 nit and approximately 0.5 nit (i.e. with contrast range 1000:1 or below) in visually small steps, whereas HDR images are encoded with a higher bit word, e.g. 10 bit (which is also captured by a camera with a larger well depth and DAC, e.g. 14 bit). In particular, HDR images typically contain many pixel values (of bright image objects) above a scene white. In particular, several pixels are brighter than 2 times a scene white. This scene white may typically be equated with the white of the NTSC/MPEG-2 reference display.

The number of bits used for the HDR images X may typically be larger than or equal to the number of bits Y used for LDR images (X may typically be e.g. 10 or 12, or 14 bit (per color channel if several of the channels are used), and Y may e.g. be 8, or 10). A transformation/mapping may be required to fit pixels in a smaller range, e.g. a compressive scaling. Typically, a non-linear transformation may be involved, e.g. a logarithmic encoding may encode (as lumas) a far larger luminance range in an X-bit word than a linear encoding, be it that the luminance difference steps from one value to the next are then not equidistant, but nor are they required to be so for the human visual system.

Figure 2:
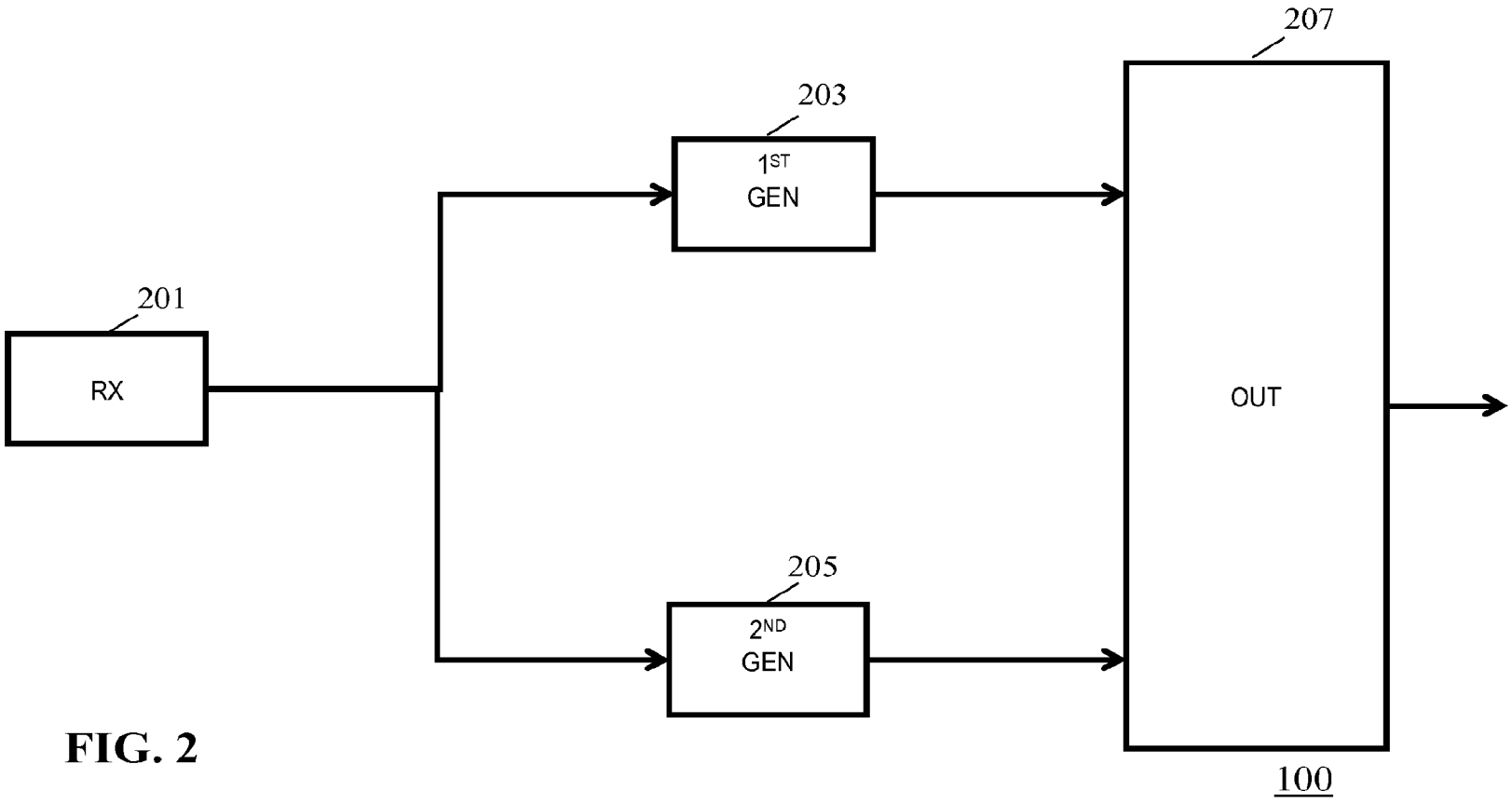
FIG. 2 is an illustration of an apparatus for generating an image signal in accordance with some embodiments of the invention.

FIG. 2 illustrates an apparatus for generating an image signal. In the image signal, pixels are encoded in N-bit words with at least one luma being encoded per pixel. The N bit words may comprise a plurality of individual components. For example, an N-bit word representing a pixel may be divided into a number of sections each containing a number of bits representing a property for the pixel. For example, the N-bit words may be divided into a number of sections each containing a pixel value component corresponding to a primary color. E.g. an N-bit word may provide an RGB pixel value by one section including bits providing the R pixel value, another section including bits providing the G pixel value, and a third section including bits providing the B pixel value.

The N-bit words representing HDR pixel values are provided in accordance with a color representation. It will be appreciated that any suitable color representation allowing HDR pixels to be represented may be used, including for example an RGB, or YCrCb color representation. It will also be appreciated that multi-primary color representations using more than three primaries may be used.

It will be appreciated that the apparatus may be used at any suitable location in the distribution path from image content generation to image content rendering. However, the following description will focus on an embodiment wherein the apparatus is implemented as part of the content processing device 103 of FIG. 1.

The apparatus comprises a receiver 201 which receives high dynamic range pixel values in accordance with a first color representation in M-bit words. The receiver 201 may specifically receive an image signal comprising pixel values for an HDR image. The signal may be received from any suitable external or internal source but in the specific example, the signal is received by the content processing device 103 from the content provider apparatus 101.

Similarly to the N-bit words generated by the apparatus of FIG. 2, the received M-bit words may also comprise a plurality of individual components. For example, an M-bit word representing a pixel may be provided in a number of sections each containing a number of bits representing a property for the pixel. For example, the M-bit words may be divided into a number of sections each containing a pixel value component corresponding to a primary color. E.g. an M-bit word may provide an RGB pixel value by one section including bits providing the R pixel value, another section including bits providing the G pixel value, and a third section including bits providing the B pixel value.

Also, the M-bit words providing the HDR pixel values are provided in accordance with a first color representation. It will be appreciated that any suitable color representation allowing HDR pixels to be represented may be used, including for example an RGB, or YCrCb color representation. It will also be appreciated that multi-primary color representations using more than three primaries may be used. For brevity and clarity, the following description will focus on an input signal comprising HDR pixel values as M-bit words in accordance with an RGB color representation.

In some embodiments, the color representation of the (input) M-bit words (the first color representation) and the color representation of the (output) N-bit words (the second color representation) may be the same and indeed N may be equal to M. Thus, in some embodiments, the same color representation may be used for the (output) image signal as for the received (input) image signal.

In the example of FIG. 2, the receiver 201 is coupled to a first generator 203 which is arranged to include N-bit words in the image signal. In the specific example, this is done by generating data packets that include the N-bit words for the image. Further, in the example, the color representations and length of the words for the input and output signals are the same, and thus the first generator 203 may directly include the received M-bit words representing the HDR pixel values in the output image signal, e.g. by directly generating suitable data packets or segments comprising the M-bit values.

The receiver 201 is furthermore coupled to a second generator 205 which is arranged to generate and include an indicator in the image signal which indicates that HDR pixel values are encoded in the image signal. Thus, an indicator is provided as part of the image signal indicating that the signal comprises HDR values. The indicator may for example be included in the image signal by being included in a data message or data packet distributed along with the data messages or data packets comprising the pixel value data.

The first and second generators 203, 205 are coupled to an output unit 207 which is arranged to output the image signal. In the specific example, the output unit 207 may simply transmit the data messages or packets containing the pixel value data and the indicator.

Thus, in the specific example, the image signal is a composite or divided signal made up by a number of independently communicated parts. In the specific example, the image signal comprises a plurality of different types of data packets. However, in other embodiments, the image signal may be provided as a combined single data stream comprising both the pixel value data and the indicator. In such examples, the data provided by the first and second generators 203, 205 may be combined into a single data or bitstream by the output unit 207. Specifically, the output 207 unit may comprise a multiplexer for multiplexing the data into a single data stream or file. The apparatus of FIG. 2 generates an image signal which not only may contain an efficient representation of HDR image data, but which also provides a flexible HDR distribution and communication. In particular, it may provide improved backwards compatibility and may e.g. allow or facilitate the introduction of HDR images into systems and standards not originally designed for HDR images. For example, it may allow suitably capable equipment (such as displays) to process the image signal as appropriate for HDR data, and thus a conditional processing of the received pixel values based on the presence or absence of an HDR indication may be achieved.

In the example of FIG. 2, the color representation of the input signal is the same as the color representation of the output signal and indeed the received HDR samples are directly included in the image signal. However, in many applications the first color representation will be different from the second color representation.

Figure 3:
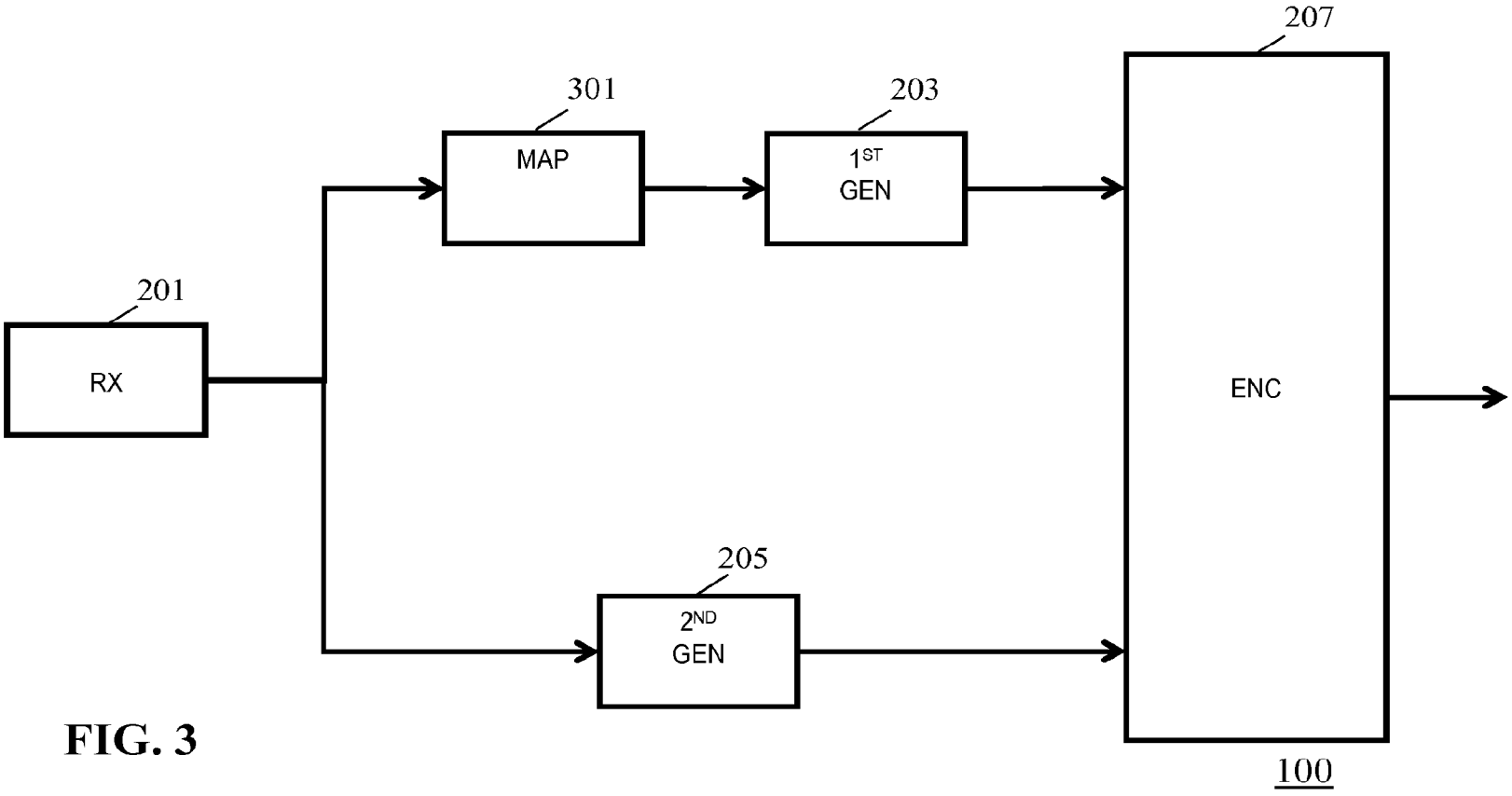
FIG. 3 is an illustration of an apparatus for generating an image signal in accordance with some embodiments of the invention.

FIG. 3 illustrates the apparatus of FIG. 2 modified to include a transformation processor 301 between the receiver 201 and the first generator 203. The transformation processor 301 is arranged to transform the high dynamic range pixel values from the first color representation to the second color representation.

The transformation processor 301 may specifically be arranged to perform a compression of the representation of the HDR pixel values such that the required number of bits is reduced. Thus, in many scenarios, the transformation unit is arranged to transform the input M-bit words to output N-bit words where M is larger than N. Thus, the transformation processor 301 may typically be arranged to generate a more compact representation of the HDR pixel values thereby allowing a reduced data rate.

The transformation may specifically include a non-linear representation of the dynamic ranges. For example, the input signal may be received as samples in accordance with a linear 16 bit RGB color representation. Thus, the input words may be 48 bit input words. Such a representation tends to provide a fairly accurate representation of the dynamic range and reduces banding etc. to acceptable limits even for relatively high dynamic ranges. However, requiring 48 bits per pixel results in a relatively high data rate that is unsuitable or undesirable for many applications.

The transformation processor 301 may accordingly process the 48 bit words to provide a more efficient representation. Such an approach may typically utilize the perceptual characteristics of the human visual system. A characteristic of human vision is that the sensitivity to brightness variations tends to be non-linear. Indeed, the luminance increase that is required for a human to perceive a brightness increase (or decrease) increases for increasing luminance. Accordingly, larger steps can be used for higher luminances than for lower luminances, and accordingly the transformation processor 301 may in many embodiments convert the linear M-bit representations into a non-linear N-bit representation. In many scenarios a suitable transform may be achieved by applying a logarithmic function to the pixel values.

The transformation may in some embodiments be implemented as or include a change in the quantization scheme used for the pixel values. A quantization scheme may provide the relationship between actual pixel values and the corresponding light radiated from the display (or from a nominal display). In particular, the quantization scheme may provide the correlations between bit values and a corresponding value of a full dynamic range.

For example, a given display range may be normalized to the range from 0-1 where 0 corresponds to a minimum light being radiated and 1 corresponds to the maximum light being radiated. A simple linear and uniform quantization scheme may simply divide the range from 0-1 into equal sized quantization intervals. For example, for a 12 bit representation, the range from 0-1 is divided into 4096 equal steps.

The transformation processor 301 may change the input quantization scheme applied to the components of the M-bit word to a different quantization scheme which is applied to the outputs of the N-bit words.

For example, the input quantization of 65336 steps for each color component may be converted into 1024 steps. However, rather than merely using a corresponding linear quantization, the transformation processor 103 may apply a non-linear quantization scheme wherein specifically the size of the quantization steps increases for increasing bit values (corresponding to increased light output). The non-uniform and non-linear representation reflects the human perception and may thus in many cases allow the reduced number of bits to provide an image perceived to be of the same quality as that of the higher number of bits generated by a uniform and linear quantization.

The change of quantization schemes may in principle be performed by de-quantizing the input M-bit words followed by a quantization into the N-bit words. However, in many scenarios, the transformation processor 103 may simply convert the words by applying suitable bit operations directly on the M-bit words, and in particular by providing a non-linear mapping of the 16 bits of each input color component into 10 bits of the corresponding output color component.

In some embodiments, the transformation processor 301 may individually and separately transform each component of the M-bit words into a corresponding component of the N-bit words. For example, an M-bit word may contain an R pixel sample, a G pixel sample, and a B pixel sample for an RGB color representation and this may be converted into an R pixel sample, a G pixel sample, and a B pixel sample for an RGB color representation of the N-bit word, where the R, G and B samples are allocated to different bits of the N-bit words.

However, a particularly advantageous performance may often be achieved by the N-bit words comprising both individual sections for each component as well as a common section representing a common component for the individual components of the N-bit word.

Specifically, a separate color value may be provided for each color component of the color representation of the M-bit words. Thus. the M-bit words may only be provided as separate color samples, such as e.g. in an RGB representation. However, the color representation of the N-bit words may include a separate value for each color component (such as for the R, G and B component) but may in addition provide a common exponential factor for all of the color components. Thus, the N-bit representation may comprise four sections with three sections providing an individual sample value for individual color components and a fourth section providing a common exponential factor for all color values. As a specific example, the transformation unit 201 may convert from an M-bit RGB representation to an N-bit RGBE representation in order to provide a more efficient representation of HDR pixel values.

It will be appreciated that in some embodiments, the transformation processor 301 may be arranged to perform more complex processing and may for example map from one color representation to another taking into account image characteristics, display characteristics etc.

For example, the apparatus may be arranged to select between a range of color representations for encoding the HDR samples, and may select the one that is most suitable for the current image data. For example, for a sequence of images having a very high dynamic range, a non-linear (e.g. logarithmic) representation may be used whereas for a sequence of image ranges having a lower dynamic range a linear representation may be used. The apparatus may in such embodiments be further arranged to include an indication of the selected encoding in the image signal (e.g. an indication of a tone mapping function, or gamma function, etc.). Thus, the indicator may indicate the specific color representation used for the N-bit words of the image signal.

It will be appreciated that any suitable mapping between the M-bit words and the N-bit words (and thus between the first and second color representations) may be used without detracting from the invention.

In some embodiments, the indicator may comprise an indication of a display luminance associated with the color representation of the N-bit words. For example, an indication of the luminance covered by the color coding range may be provided.

As a specific example, the second color representation may be associated with a reference or nominal display. The reference display may correspond to a given maximum luminance and the indication may for example indicate that the brightest code (e.g. 1023 for a 10 bit representation) is intended to correspond to a luminance of, say, 50 000 nits. This allows e.g. to include a differently graded representation, and a smart receiving apparatus can take that into account.

Such an indication may in a receiver be used to adapt the received HDR pixel samples to the rendering luminance of the specific display. Indeed, in many cases it will be more advantageous to perform a mapping of the HDR pixel samples into driving values for the display by taking into account the absolute luminance range that can be provided.

For example, if the HDR pixel values are merely provided as relative values to a normalized dynamic range (say from 0 to 1), the display will typically render the image using the corresponding fractional luminances. E.g. a pixel value of 0.5 will be rendered as half of the maximum light output. However, for HDR content and/or HDR displays such an approach may not be optimal. E.g., an image of a beach with a sun in the sky and some dark areas may use the full dynamic range to provide a very bright (luminous) sun when presented on a 50 000 nits display. Due to the large dynamic range, this is possible while still providing a bright (but darker) beach and sky, and while still providing details of shadow areas. However, if the same image is presented on a 10 000 nits display, a simple linear scaling will result in the sky and beach being represented by much lower luminosities resulting in them appearing relatively dark and dull. Further, the shadow detail may be compressed so much that detail is no perceivable (or even renderable). Instead, it would be advantageous for the display to clip the very strong sun to lower luminance values while maintaining or only moderately reducing the luminance for the sky and beach. Thus, an adaptive and non-linear mapping may be performed. However, such an approach requires the display to not only consider the display characteristics, and especially luminance range, but also to know the actual absolute luminances that the received HDR pixel values are intended to correspond to.

The approach may for example allow that an encoding of the HDR image is performed according to any suitable HDR space while allowing the image to be rendered on any display, e.g. one with 1000 nit output, one with 20000 nit output, etc. This can be achieved by performing gamut mapping and this gamut mapping may specifically be in response to the differences between the absolute luminance differences between the reference for the encoding and the actual display on which it is rendered. E.g. if a display merely mapped e.g. a 50 000 nit HDR range to, say, 1000 nits available at the specific display (with everything linearly compressed), then most colors would be rendered too dark. A better approach may be to e.g. map the luminances above, say, 5000 nits, to be very close to the white of the display (e.g. 950 nit). For example, the range from 5000 nits to 50000 nits may be mapped to 950 nits to 1000 nits; 1000 nits to 5000 nits may be mapped to 850 nits to 950 nits; 750 nits to 1000 nits to 750 nits to 850 nits, and the remaining range of 0-750 nits may simply be mapped to itself.

In many embodiments, the image signal may be generated to include a data segment in which pixel image data is provided. For example, the image signal may be in accordance with a standard that specifies specific data segments in which to include pixel values. In some embodiments, such segments can be used for HDR pixel values or may be used for LDR pixel values. Thus, sometimes the data segment may comprise LDR pixel values and other times the data segment may contain HDR pixel values. In such embodiments, the indicator may be used to indicate the type of data which is included in the data segment. Thus, the indicator may be indicative of whether the data segment includes HDR data or LDR data. Such an approach allows for a very flexible system, and in particular may facilitate introduction of HDR data communication/distribution in existing systems and standards since existing defined LDR data segments may be reused for HDR data with the only requirement being that a new indicator is introduced.

Figure 4:
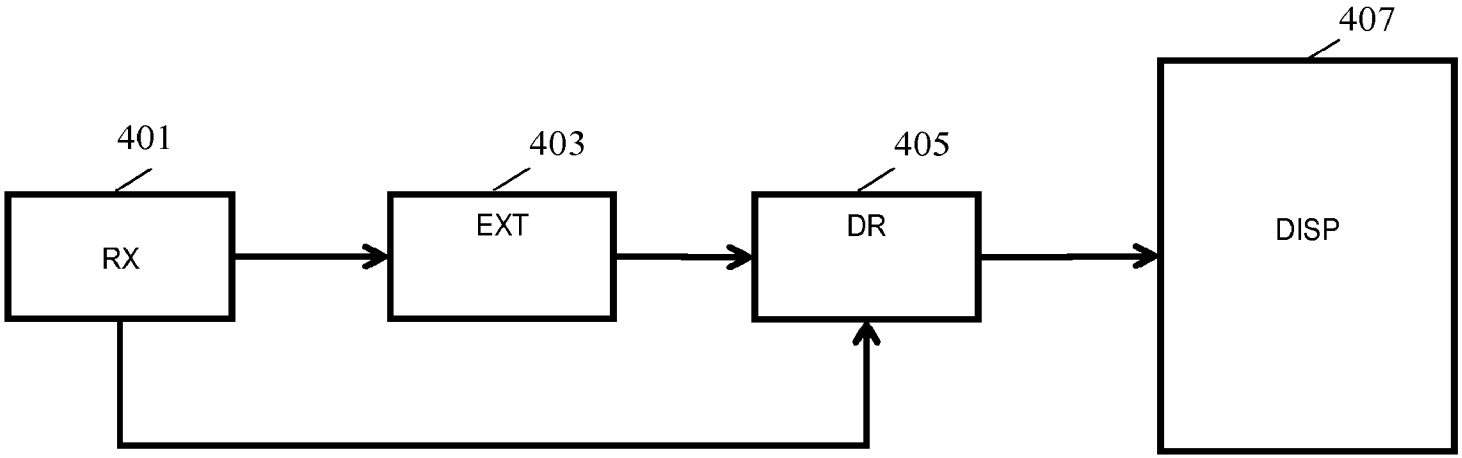
FIG. 4 is an illustration of an apparatus for processing an image signal in accordance with some embodiments of the invention.

FIG. 4 illustrates an example of a sink for processing a signal provided by an apparatus as previously described. In the specific example, the sink is a display arranged to present the image of the image signal. The sink may specifically be the display 107 of FIG. 1.

The display 107 comprises a receiver 401 which receives the image signal. The image signal comprises a data segment which may contain high dynamic range pixel values in N-bit words according to one color representation or may contain low dynamic range pixel values (according another color representation). The image signal further comprises an indicator which is indicative of whether the data segment comprises the high dynamic range pixel values or the low dynamic range pixel values.

The receiver 401 is coupled to an extractor 403 which is arranged to extract the data from the data segment. The extractor 403 thus retrieves the pixel sample data from the image signal.

The extractor 403 is coupled to a processor for processing the pixel sample data. In the example, the processor is a display driver 405 which is further coupled to a display panel 407 and the receiver 401.

The display driver 405 receives the pixel sample data from the extractor 403 and the indicator from the receiver 401 and proceeds to generate a display drive signal for the display panel 407.

The processing of the display driver 405 is dependent on whether the indicator indicates that the pixel data is for an HDR or LDR image. For example, if the display is an LDR display, it may directly generate drive signals corresponding to the pixel values for the display provided the indicator reflects that the pixel values are already LDR values. However, if the indicator reflects that the received pixel values are indeed HDR pixel values, the display driver 405 may proceed to perform gamut mapping and other conversion from HDR to LDR. For example, a non-linear scaling may be applied to the HDR pixel values (e.g. corresponding to a log operation and clipping operation). Such a conversion may further take into account the dynamic range associated with the received HDR data in adapting the conversion.

Conversely, if the display is an HDR display it may directly use pixel values when the indicator indicates that the pixel data is HDR data, and may perform a gamut conversion (including luminance enhancement) when the indicator indicates that the pixel data is LDR data.

In some embodiments, the system may be arranged to provide an efficient encoding of the HDR pixel values such that not all available data bits are used. For example, the data segment may be arranged to provide pixel data values in K-bit words. The data segment may for example be a color enhancement data segment which may provide an improved accuracy. For example, the data segment may provide 16 bit LDR RGB data values corresponding to K being equal to 48 bits. However, the HDR data may be generated in accordance with an efficient encoding, such as for example in accordance with a 32 bit RGBE representation. In such embodiments, there are 16 additional bits for each pixel not used by the HDR data. This additional data may in some cases be used to provide other information. For example, the non-used bits may be used to provide additional color information. In other embodiments, the bits may be set to a constant value to provide a more efficient coding thereby reducing the data rate.

In some embodiments, the apparatus of FIG. 2 (or 3) may be arranged to generate an image signal which comprises a second indicator that indicates that the data segment is used for LDR data even in the case where it is used for LDR data. Thus, this second indicator may indicate that the data of the data segment is conventional LDR data in accordance with a suitable LDR representation both in the case when the data segment indeed does contain such LDR data but also when it contains HDR data in accordance with a different color representation.

Thus, in such an embodiment, the image signal may contain a plurality of indicators which may in some scenarios be in conflict with each other (or where one indicator may be "wrong").

The approach may allow some equipment, processing and functionality to only use the second indicator resulting in the data being handled exactly as if it was LDR data. Such an approach is particularly suitable for components that are not capable of handling HDR data (e.g. legacy equipment) but can handle image signals with LDR data. However, at the same time other equipment, processing and functionality may be arranged to use the first indicator to correctly interpret the data of the data segment, and accordingly to process it as HDR data. Such HDR capable components can accordingly take full advantage of the HDR data.

The approach may be particularly suitable for enhancing existing LDR systems and standards to include HDR data. For example, the second indicator may be an indicator of the original LDR system/standards with the first indicator being a new indicator introduced to the system when enhancing this to include HDR. The new indicator may be provided in an optional section of the image signal. In this way, existing equipment which is e.g. used for communication, routing, switching etc. may process the signal in exactly the same way as an LDR signal based only on the first indicator. Thus, since the HDR data is encoded in a data segment which may be used for LDR data, and the second indicator corresponds thereto, legacy equipment will not know the difference between an HDR signal and an LDR signal. Accordingly, the existing LDR distribution equipment may be used to distribute the HDR data from an HDR source to an HDR sink. However, the HDR capable sink will be arranged to look for the first indicator and can accordingly determine that the data contained in the data segment is HDR data and not LDR data.

In the following, a specific example will be provided of an embodiment wherein the image signal is generated in accordance with the HDMI™ standard. The embodiment utilizes the Deep Color mode of HDMI™ to introduce HDR content.

HDMI™ supports transmission of video content of various pixel encodings such as YCbCr 4:4:4, YCbCr 4:2:2 and RGB 4:4:4. In the standard HDMI™ encoding formats, 8 bits are available per component corresponding to the pixel values being provided in 24 bit words. However, in addition HDMI™ supports transmission of content with a higher color accuracy and/or wider color gamut than the normal 8 bits per component. This is called Deep Color mode and in this mode HDMI™ supports up to 16 bits per component (48 bits per pixel, i.e. 48 bit words).

Deep color mode is based on the clock rate of the link being increased with a ratio to the pixel depth/24 (24 bit/pixel=1.0× pixel clock) and an additional control packet being transmitted that indicates to the sink the color depth and the packing of the bits (control packet may thus be an example of the second indicator mentioned above). This same mechanism is in the example also used for transmission of HDR content and no changes to this mechanism are required.

In the example HDR content is communicated in the Deep Color data segments rather than the enhanced accuracy LDR data. The communication is achieved by setting the HDMI™ communication up as for a Deep Color mode but with an additional indication being introduced to reflect that the data is not enhanced LDR data but is instead HDR data.

Furthermore, the pixel encoding does not merely use the linear RGB 16 bit per component approach of Deep Color mode with an enhanced dynamic range but instead provides the HDR data using efficient HDR pixel encodings such as for example RGBE, XYZE, LogLuv, or e.g. the 12 bit RGB single precision floats encoding that is also used for HDMI™ Deep Color mode. This more efficient HDR encoded data is then transmitted using the transmission mode for Deep Color of HDMI™.

Figure 5:
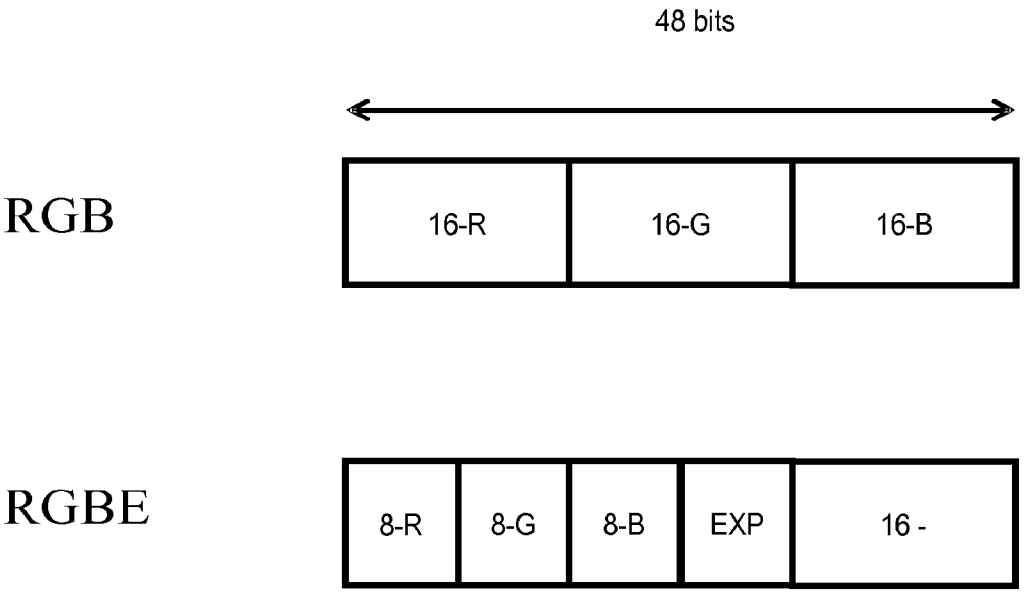
FIG. 5 illustrates examples of encoding of pixel values.

For example, as illustrated in FIG. 5, a Deep Color 48 bit word comprises three 16 bit components corresponding to a linear R, G and B sample. The encoding of HDR data in such a linear color representation tends to be suboptimal, and in the example of FIG. 5 the 48 bit word is instead used to provide an 8 bit mantissa for each R, G and B sample together with an 8 bit exponent. Or it could be used for 3*12 or 3*14 bit mantissas+6 bits exponent, etc.

The exponent value provides a common scaling factor for the three mantissas with the scaling factor being equal to 2 to the power of the exponent value minus 128. The mantissas may be linear and may be provided as floating point values. Such an RGBE encoding may provide a much more efficient representation of the very large dynamic range associated with HDR data. Indeed, in the example, the encoding uses only 32 bits thereby leaving more bandwidth on the interface which can e.g. be used for transmission of 3D or 4 k2k formats The approach allows an efficient communication of HDR using HDMI™ and indeed requires minimal changes to the HDMI™ standard. A facilitated introduction of HDR to HDMI™ may be achieved and in particular no new hardware is required. Furthermore, existing equipment may be capable of switching HDR data as this can be treated as Deep Color data.

In the example, the HDMI™ interface is set to Deep Color mode but with an indicator set to indicate that the content transmitted is not Deep Color data but rather HDR data. The indicator may be provided by setting suitably reserved fields in an AVI (Auxiliary Video Information) Infoframe. As another example, the indicator may be provided in the form of a new infoframe being defined specifically for indicating transmission of HDR content. As yet another example, the HDMI™ vendor specific infoframe may be used to provide the indication.

In more detail, signaling in HDMI™ is based on CEA 861-D. CEA861-D defines the signaling from the sink to the source through E-EDID and from the source to the sink through the AVI-infoframe. The AVI infoframe provides frame signaling on color and chroma sampling, over- and underscan and aspect ratio.

In accordance with some embodiments, the HDMI interface is set to indicate transmission of Deep Color content but preferably with an HDR pixel encoding in the form of e.g. RGBE (or other efficient HDR representations).

A possible exemplary (part of an) AVI-info frame may be.

| Packet Byte # | CEA 861-D Byte # | 7 | 6 | 5 | 4 | 3 | 2 | 1 | 0 |
|---|---|---|---|---|---|---|---|---|---|
| PB0 | n.a. | checksum | | | | | | | |
| PB1 | Byte 1 | Rsvd (0) | Y1 | Y0 | Fields not relevant for this description | | | | |
| PB2 | Byte 2 | C1 | C0 | Fields not relevant for this description | | | | | |
| PB3 | Byte 3 | ITC | EC2 | EC1 | EC0 | Q1 | Q0 | Not relevant | |
| PB4 | Byte 4 | Video Identification Codes (VIC) | | | | | | | |
| PB5 | Byte 5 | YQ1 | YQ0 | CN1 | CN0 | Fields not relevant for this description | | | |

Y1 and Y0 indicate the color component sample format and chroma sampling used. For transmission of HDR content, this may be to 00 or 10 indicating RGB and YCbCr 4:4:4. Preferably the currently reserved value 11 may be used to indicate RGBE or another suitable HDR representation.

C1 and C0 indicate the colorimetry of the transmitted content. For HDR content, this may be set to 00 meaning no data or 11 to indicate that an extended colorimetry is used as is further indicated in bits EC0, EC1 and EC2.

ITC indicates whether the content is IT content and this bit is used in conjunction with CN1 and CN0 to indicate to the sink that it should avoid any filter operations or analog reconstruction. For HDR content this bit may typically be set.

EC2, EC1 and EC0 indicate the color space, colorimetry of the content. For HDR one of the currently defined wider gamut ones may be used. Also the currently reserved fields may be used to indicate other color spaces more suitable for future HDR displays.

Q1 and Q0 indicate the RGB quantization range, for HDR content full range (10) or 11 (which is currently reserved) could be used to indicate HDR content being transmitted in Deep Color mode. YQ1 and YQ0 indicate the same but for YCC quantization. Again there are two reserved fields that could be used for the purpose of indicating HDR content carried in Deep Color mode, such as e.g. 36 bit YCrCb.

CN1 and CN0 indicate the content type (Graphics, Photo, Cinema, Game) for IT application and are used in combination with the IT bit.

In order to allow the Sink (the display) to indicate that it supports HDR content an extension of the E-EDID specification may be implemented. HDMI™ uses E-EDID for signaling display capabilities from the display back to the playback device. The HDMI™ specification, through a HDMI™ vendor specific data block in the E-EDID, already specifies how to indicate support for Deep Color mode transmission. This may be enhanced to also include the possibility of support for HDR formats such as RGBE or other HDR color encodings.

As another example an indicator may be included to indicate that the display supports HDR content and a list of the color encodings that it can support in addition to those already specified in HDMI™ such as; RGBE, XYZE, LogLuv 32, or even EXR.

An extended version of the HDMI™ vendor specific data block with signaling for HDR support may for example be as follows:

| Packet Byte # | 7 | 6 | 5 | 4 | 3 | 2 | 1 | 0 |
|---|---|---|---|---|---|---|---|---|
| PB0 | | | Not relevant | | | Length | | |
| PB1 | | | 24 bit IEEE registration identifier | | | | | |
| PB2 | | | | | | | | |
| PB3 | | | | | | | | |
| PB4 | | | | Not relevant | | | | |
| PB5 | | | | | | | | |
| PB6 | | | | Not relevant | | | | |
| PB7 | | | | | | | | |
| PB8 | Not relevant | | | HDMI_HDR_ present | | | | |
| PB9-15 | | | | Not relevant | | | | |
| PB16 | HDR_color_ encoding | | | | Reserved | | | |
| PB(length) | | | | | | | | |

where "HDMI_HDR_present" indicates that the display supports HDR content and "HDR_color encoding" indicates any additional color encodings supported. As another example, the approach may be used for a DisplayPort interface.

For example, an approach similar to that described for HDMI may be used with the image data of a main content stream containing LDR data, HDR data or indeed both. An indicator may be provided to indicate the type of the image data in the content stream. The control and configuration data (including in particular the indicator) may be provided in Secondary Data Packets, and may in particular be provided using CEA 861 InfoFrames as described for HDMI. Further, the AUX channel may be used to exchange control information. In particular, the display's capability for handling HDR data may be communicated using the AUX channel.

As yet another example, the approach may be used for Blu-ray Disc™ systems.

It will be appreciated that the described system may be used with many different types of content creation, provision and consumption including for example consumer systems.

Figure 6:
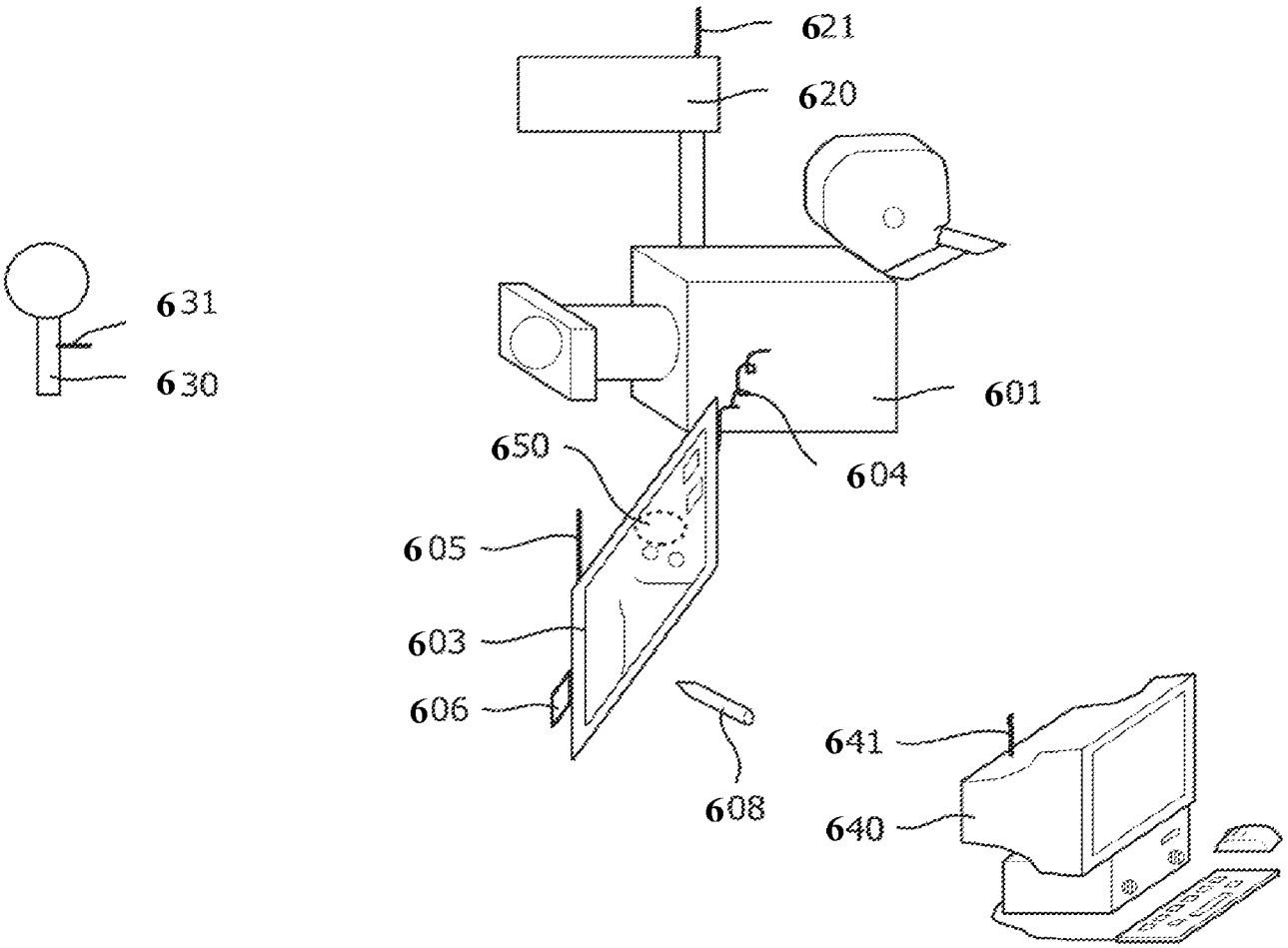
FIG. 6 illustrates an example of a system for generating audiovisual content.

FIG. 6 schematically shows an example of some of the apparatuses that may be present at the creation (transmission) side to be used for creating a good color description signal. In the example, the apparatuses are integrated with a classical celluloid film camera (note that the digital assisting representation of the scene will only fully [as to the pixel values of the analog vs. digital recordings] be linkable to the actually captured celluloid picture if movie material calibration models are incorporated for mapping the two (however, the development is then still an unknown variable that can be supplementary played with), but even without those, the digital recording can still yield very valuable side information, e.g. if it is geometrically co-registered with the celluloid captured view window, one can define regions, and apart from the celluloid captured developed grain values one can code e.g. linear actual scene view values via the digital capturing), because the skilled person will understand how to transpose these components to the room of a color grader, or a transcoder doing the same for e.g. an old Laurel and Hardy picture.

FIG. 6 show attached to camera 601, a digital display 603 (which e.g. gets a feed from a CCD co-registered with the camera lens). However the connection 604 need not be fixed but can also be a transmitter for a number of separate displays (e.g. one for the camera operator and one in the overview stack of the director). Upon the display 603 the camera operator or director of photography can draw e.g. a region 650 which they know they have calibrated with their stage lighting as a dark part of the image, which can be done with e.g. a light pen 608 or other user interface input means [we show only one example, because we think the skilled person can well understand which types of system allow a user to give feedback on a displayed image]. The display 603 may store added information onto a memory 606 (e.g. a detachable memory stick), or communicate via a transmission system 605. It can also receive further information from an in-filming-situ scene analysis device 620 (which may simply be a light meter or even a spatially sampling spectrometer), via its transmission system 621, which may also transmit to the final data accumulation place (i.e. 640). Furthermore, in-scene meters 630 (i.e. local illumination meters to measure how actor's faces are illuminated, especially when with highly variable lighting; sphere systems looking at the surrounding illumination distribution; etc.) may transmit their data to any part of the system via their transmission system 631. The receiving display can then try to reproduce the light in its original brightness, or at least a fraction (or function) thereof, typically in accordance with some psychovisual model for creating a similar look or an artistic look etc. All data is accumulated on a data accumulation apparatus 640 with on-board memory, typically a computer (with transmission system 641).

The system illustrated in FIG. 6 may thus e.g. be used by an operator to generate an LDR image by manual color grading/tone mapping (and also a HDR image may be composed, or at least a partial look therefore). The resulting LDR image can then be encoded and represented in the first pixel picture. The system may further automatically determine parameters for generating the HDR image. Alternatively, the operator may also use the system of FIG. 6 to generate the HDR extension data, e.g. by a semi-automated process.

Figure 7:
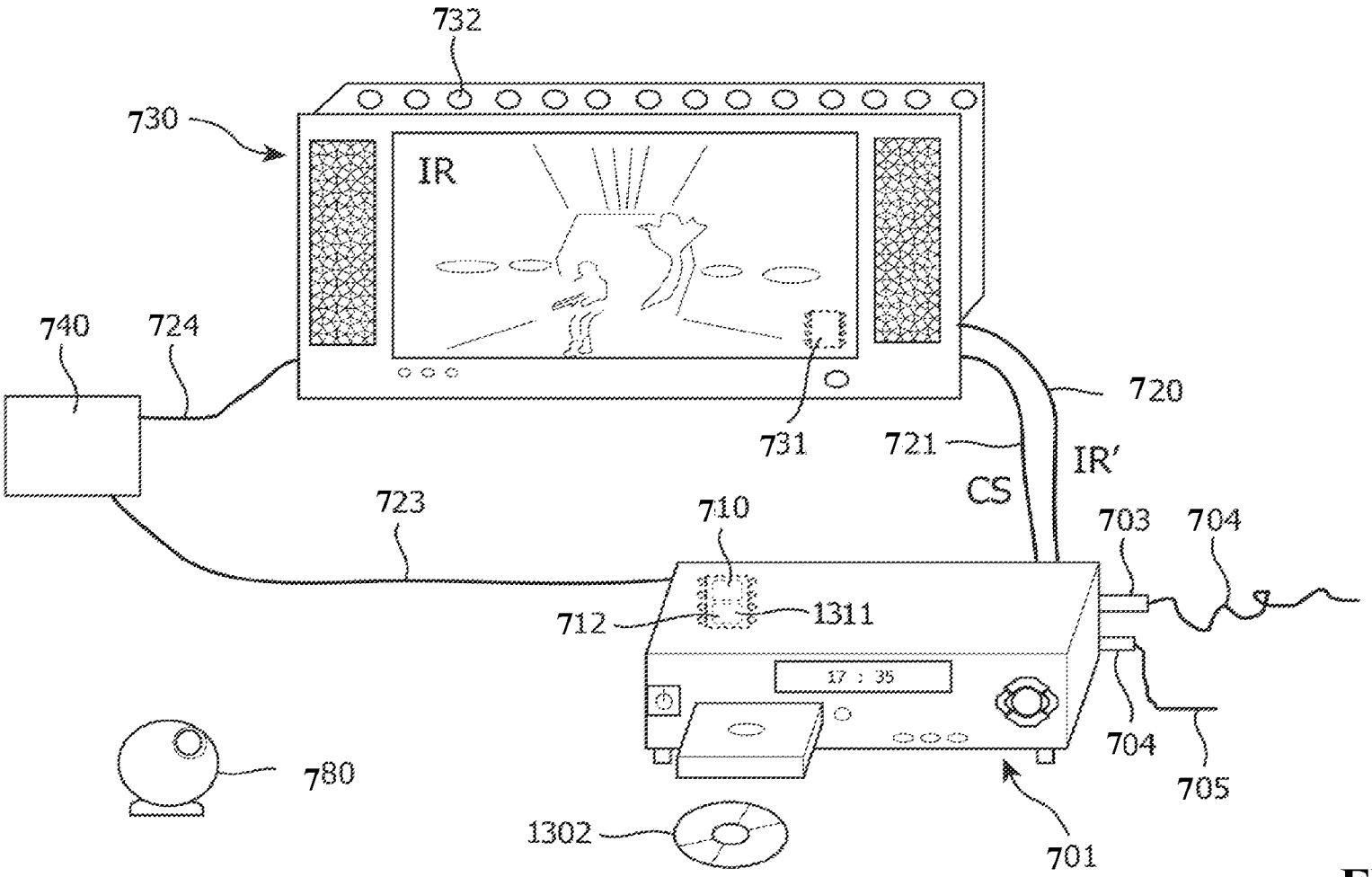
FIG. 7 illustrates an example of a system for processing audiovisual content.

FIG. 7 shows an exemplary image decoding and displaying system at the receiving side, e.g. in a consumer's living room (the skilled person will understand how a similar system according to principles of our invention will look in e.g. a digital cinema theatre). An embodiment of color rendering image processing apparatus 701 is a set top box (which may correspond to the content processing device 103 of FIG. 1) with built-in Blu-ray reader (but this may also be e.g. a laptop computer, or portable device like a mobile phone etc., i.e. the apparatus 701 can be as small as a plug-in card [as long as it is able to read the regime specifications, and allow color processing with it] or as big as a professional cinema transcoding studio) is able to receive a Blu-ray 702 with the entire LDR/HDR extension image signal encoded on it, i.e. both the first picture with the LDR and the second picture with HDR extension data included.

The apparatus may as another example received the signals via a first connection 703 to e.g. a television signal transmission cable (or antenna, or input for digital photos on a memory card, etc.; image signal may also variously mean e.g. a television standard encoded signal, or a raw image file etc.) 704 which carries the (typically compression encoded) input signals. In some embodiments the two pictures could be provided via two paths, e.g. the HDR description data may come over another medium via a second connector 704 e.g. connected to the internet 705.

The apparatus 701 has an IC which has at least an extractor 711 arranged to extract the data, and either output it directly or convert it to new values more suitable for doing controlled image processing by an image processing unit 712. This may be embodied so simple as to only apply some tone reproduction transformations to the pixels corresponding to the special to be rendered regime, or have complex algorithms, e.g. typically corresponding to any of the algorithms that can be applied at the creation side, e.g. a segmentation and/or tracking algorithm/unit.

The player 701 may output its improved intended rendering output image IR' to the display/television over a video cable 720 (e.g. HDMI), but since the television may do (or be requested to do) additional processing (on its image analysis and/or processing IC 731), a second connection (cable or wireless) 721 may be present for control signals CS (which may comprise any data from the signal and/or control data derived therefrom). Typically these additional control signals may be added over the video cable, by updating e.g. the (wireless) HDMI protocol. The apparatus 723 may also send color signals over connection 723 to a second, environment color display 740, which may also obtain its intended rendering color input signals via the display 730. The exemplary display is with a LED backlight 732, ideal for HDR rendering. Environment measurement devices like measurement device 780 may be present e.g. a cheap camera which can check the surround of the television, lights in the room, reflections on the television front plate, visibility of calibration grey scales, etc., and they may communicate this information to apparatus 701 and/or display 730.

The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data traveling via a network connection —wired or wireless—, or program code on paper. Apart from program code, characteristic data required for the program may also be embodied as a computer program product. Some of the steps required for the operation of the method may be already present in the functionality of the processor instead of described in the computer program product, such as data input and output steps.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An apparatus for generating an image signal [in which pixels are encoded in N-bit words], the apparatus comprising:

a memory;

at least one processor *circuit* coupled to the memory, *wherein* the at least one processor [being] *circuit is* configured to:

[decode received] *receive* high dynamic range pixel values*;*

*store the high dynamic range pixel values in the memory, wherein the high dynamic range pixel values are arranged* in [accordance with] a first color representation [in M-bit words];

encode the high dynamic range pixel values [in] *into* the image signal [of N-bit words] according to a second color representation; and compute an indicator [in the image signal of a type of high dynamic range encoding], wherein the indicator [is transmitted for specifying which high dynamic range pixel values are encoded and how the high dynamic range pixel values are transformed for display] *comprises a luminance at which a maximum luma code is to be displayed; and*

*output the image signal, wherein the image signal comprises the encoded high dynamic range pixel values and the indicator*.

2. The apparatus of claim 1, wherein the first color representation is different from the second color representation.

3. The apparatus of claim 2, wherein the at least one processor *circuit* is [further] configured to transform the high dynamic range pixel values from the first color representation to the second color representation.

4. The apparatus of claim 2,

*wherein the high dynamic range pixels comprise M-bit words,*

*wherein the encoded pixels comprise N-bit words* wherein the at least one processor *circuit* is [further] configured to compress M-bit words into N-bit words, where M is larger than N.

5. The apparatus of claim [4] *1*, wherein the at least one processor *circuit* is [further] configured to use a different quantization scheme for the pixel values in accordance with the second color representation than for the pixel values in accordance with the first color representation [to compress the M-bit words into the N-bit words].

6. The apparatus of claim 1, wherein the first color representation is the same as the second color representation.

7. The apparatus of claim 1, wherein the indicator comprises an indication of a peak white of the second color representation.

8. The apparatus of claim 1, wherein the indicator specifies a distribution of luma or color values,

[along a range] *wherein the distribution describes a mapping of a first set* of codeable colors in the [M-bit] *first color* representation [along] *to* a *second set of* codeable [range of the N-bit signal] *colors in the second color representation*.

9. The apparatus of claim 1, wherein the first color representation [employs] *comprises* a separate color value for each color component of the first color representation, [and]

*wherein* the second color representation [employs] *comprises* a set of color values for each color component of the second color representation together with a common exponential factor.

10. The apparatus of claim 1, wherein the image signal comprises a segment,

[for] *wherein the segment comprises* pixel image data, [and]

*wherein* the at least one processor *circuit* is [further] configured to [alternatively] *either* include low dynamic range pixel values, or the high dynamic range pixel values according to the second color representation in the segment, [and]

*wherein* the indicator specifies whether [a first] *the* segment comprises low dynamic range color values or high dynamic range color values.

11. The apparatus of claim [10] *1*, wherein the at least one processor *circuit* is [further] configured to include a second indicator in the image [signals] *signal*,

*wherein* the second indicator [stating] *indicates* that the [segment] *image signal* is encoding low dynamic range pixel values [both] when the [segment] *image signal* comprises [low dynamic range pixel values and when the segment comprises] high dynamic range pixel values.

12. The apparatus of claim 1, wherein the at least one processor *circuit* is [further] configured to include the high dynamic range pixel values in a Deep Color data segment according to an HDMI standard.

13. The apparatus of claim 1, wherein the at least one processor *circuit* is [further] configured to include the indicator in an Auxiliary Video Information InfoFrame.

14. A method of generating an image signal [in which pixels are encoded in N-bit words], the method comprising:

[decoding received] *receiving* high dynamic range pixel values in accordance with a first color representation [in M-bit words];

encoding the high dynamic range pixel values in the image signal [of N-bit words] according to a second color representation; and computing an indicator [in the image signal] of a type of high dynamic range encoding, wherein the indicator [is transmitted for specifying which high dynamic range pixel values are encoded and how the high dynamic range pixel values are transformed for display] *comprises a luminance at which a maximum luma code is to be displayed; and*

*transmitting the image signal and the indicator*.

15. An apparatus for processing an image signal, the apparatus comprising:

a memory;

at least one processor *circuit* coupled to the memory, *wherein* the at least one processor [being] *circuit is* configured to:

receive the image signal, [a data segment of the image signal comprising one of]

*wherein the image signal comprises* high dynamic range pixel values [in N-bit words] *encoded* according to a [first] *second* color representation [and],

[low dynamic range pixel values according to a second color representation, and for receiving]

*wherein the image signal comprises* an indicator [indicative] of a type of high dynamic range encoding of the high dynamic range pixel values,

[wherein the indicator specifies which high dynamic range pixel values are encoded and how the high dynamic range pixel values are to be transformed for display]

*wherein the indicator comprises a luminance at which a maximum luma code is to be displayed*;

[extract data of the data segment;] and process the [data of the data segment as high dynamic range pixel values dependent on the value of the indicator] *image signal according to the luminance at which a maximum luma code is to be displayed.*

16. The apparatus as claimed in claim 15, wherein at least one processor *circuit* is configured to map the [N-bit words] *high dynamic range pixel values* to display renderable output signals in dependence on a coding [used in the N-bit words] as indicated by the indicator.

17. The apparatus as claimed in claim 15, wherein the at least one processor *circuit* is configured to apply a color transformation implementing at least a mapping of grey values along a first luminance range associated with the [N-bit words,] *first color representation* to a [second] *third* luminance range,

*wherein the third luminance range is* associated with a display,

[in which] *wherein* the color transformation is dependent on [a peak white, or any white level indication characterizing a scene luminance level of the maximum luminance codeable with the N-bits words] *the luminance at which a maximum luma code is to be displayed.*

18. The apparatus of claim 15, wherein the image signal is in accordance with an HDMI standard[, and the at least one processor is further configured to transmit an indication of a capability to process high dynamic range pixel values in an HDMI vendor specific data block].

19. A method of processing an image signal, the method comprising:

receiving the image signal, [a data segment of the image signal] comprising [one of] high dynamic range pixel values [in N-bit words] according to a [first] *second* color representation [and low dynamic range pixel values according to a second color representation];

receiving an indicator [indicative of a type of high dynamic range encoding that specifies which high dynamic range pixel values are encoded and how the high dynamic range pixel values are transformed for display], *wherein the indicator comprises a luminance at which a maximum luma code is to be displayed*; and processing the [data of the data segment as] high dynamic range pixel values [or as low dynamic range pixel values dependent] *based* on the value of the *luminance at which a maximum luma code is to be displayed as indicated in the* indicator.

*20. A method of processing an image signal as claimed in claim 19, wherein the high dynamic range pixel values are received in N-bit words, and wherein the method comprises mapping the N-bit words to display renderable output signals in dependence on a coding used in the N-bit words as indicated by the indicator.*

*21. A method of processing an image signal as claimed in claim 19, further comprising applying a color transformation implementing at least a mapping of grey values along a first luminance range associated with the first color representation to a third luminance range,*

*wherein the third luminance range is associated with a display,*

*wherein the color transformation is dependent on the luminance at which a maximum luma code is to be displayed.*

*22. The method of generating an image signal as claimed in claim 14, further comprising including a second indicator in the image signals, wherein the second indicator specifies that the image signal is encoding low dynamic range pixel values when the image signal comprises the high dynamic range pixel values.*

*23. The apparatus of claim 1, wherein the indicator specifies which type of the high dynamic range pixel values are encoded.*

*24. The method of claim 14, wherein the indicator specifies which type of the high dynamic range pixel values is encoded.*

*25. The method of claim 19, wherein the indicator specifies which type of the high dynamic range pixel values is encoded.*

* * * * *